United States Patent [19]

Börger

[11] Patent Number: 4,903,645
[45] Date of Patent: Feb. 27, 1990

[54] INTAKE MANIFOLD

[75] Inventor: Herbert Börger, Heidelberg, Fed. Rep. of Germany

[73] Assignee: Firma Carl Freudenberg, Weinheim, Fed. Rep. of Germany

[21] Appl. No.: 339,683

[22] Filed: Apr. 18, 1989

[30] Foreign Application Priority Data

May 3, 1988 [DE] Fed. Rep. of Germany ....... 3814955

[51] Int. Cl.⁴ ............................................ F02M 31/00
[52] U.S. Cl. ................................ 123/52 MC; 123/549
[58] Field of Search ........ 123/52 M, 52 MV, 52 MC, 123/549

[56] References Cited

U.S. PATENT DOCUMENTS

| 1,724,481 | 8/1929 | Heginbottom et al. | 123/549 |
| 3,892,215 | 7/1975 | Hickling et al. | 123/52 MV |
| 4,359,974 | 11/1982 | Igashira et al. | 123/52 M |
| 4,401,090 | 8/1983 | Fujimoto et al. | 123/549 |

Primary Examiner—David A. Okonsky
Attorney, Agent, or Firm—Felfe & Lynch

[57] ABSTRACT

An intake manifold for an internal combustion engine, consisting of a flow channel enclosed by a wall. The wall (1) consists at least partly of electrically conductive, polymeric material and can be connected with a source of voltage (3) by means of connectors (2, 7), which are at a distance from one another, and heated by this voltage source.

8 Claims, 1 Drawing Sheet

INTAKE MANIFOLD

BACKGROUND OF THE INVENTION

The invention relates to an intake manifold of the type having an electrically conductive wall about a flow channel which can be heated at least in part by the wall.

Such an intake manifold is known. It consists of a cast aluminum alloy and has the function of supplying the mixture of gasoline droplets and air prepared in the carburetor or by the single-point injection system to the individual cylinders of the internal combustion engine. During a cold start, however, the mixture tends to condense on the internal surface of the intake manifold, which in the final analysis causes the mixture to become leaner and can result in a poor operating behavior of the engine. It is therefore necessary to make a richer mixture available for this phase of the operation. However, this causes a high fuel consumption and high emission values.

To avoid this disadvantage, provisions have been made for the version addressed at the beginning to construct the intake manifold at least in part with a double wall and to pass a coolant through the space between the two walls in order to bring about rapid heating. In the cold-starting phase, however, the coolant has not yet been heated sufficiently to eliminate the problem addressed effectively.

Further problems may arise with the version named at the beginning when the hot engine, which has just been switched off, is started once again. In a corresponding operating situation, a great accumulation of heat may be observed in the area of the cylinder head, which results in strong heating of the carburetor over the aluminum intake manifold. The fuel in the carburetor is evaporated by this heating and it becomes difficult to start the engine once again. The proposal has therefore already been made to provide a flange, which may consist, for example, of rubber and acts as a thermal insulator, between the carburetor and the intake manifold. The procurement and installation of such a flange, however, require additional expenditure.

According to a different proposal, the provision of an electrical heater for heating the combustion mixture in the intake manifold, which consists of a metallic material, is already known. However, the initially addressed problem with respect to the cold starting as well as with respect to the hot starting cannot be eliminated in a satisfactory manner with this heater.

SUMMARY OF THE INVENTION

It is an object of the invention to provide an intake manifold, which can be produced in a cost-effective manner, is easily installed, makes problem-free cold and hot starting possible and, at the same time, makes the adjustment of the combustion mixture largely superfluous.

Pursuant to the invention, this objective is accomplished for an intake manifold of the initially named type by using an electrically conductive polymeric material for the heatable part of the wall, and providing spaced apart means for connecting the material to a voltage source so that the material can be heated.

In the inventive intake manifold, the wall surrounding the flow channel consists completely of a polymeric material. This material is electrically conductive over at least a part of its extent and can be connected through connectors, which are at a distance from one another, with a voltage source and be heated by this. The proportion of the internal surface of the flow channel, which can be heated in this manner, may be of any size. This opens up the possibility of preventing the condensation of fuel at this surface during the cold starting phase practically completely. Problems with cold starting are therefore no longer to be expected.

With respect to the problem-free hot starting, on the other hand, the excellent thermal insulating behavior of the polymeric material forming the wall of the inventive intake manifold has a favorable effect. The carburetor is thereby insulated in an outstanding manner from the cylinder head. This prevents the evaporation of fuel within the carburetor and makes the use of a secondary insulating flange unnecessary. The installation of the inventive intake manifold is consequently conceivably simple.

Using known techniques of processing synthetic materials, the inventive intake manifold can be produced cost effectively and in an unvarying quality, especially if the injection molding technique for synthetic materials is employed, which makes use of a disposable core. The outer contour of the intake manifold can thereby be modified to a large extent and adapted in a simple manner to the different types of internal combustion engines.

DETAILED DESCRIPTION

Figure 1:
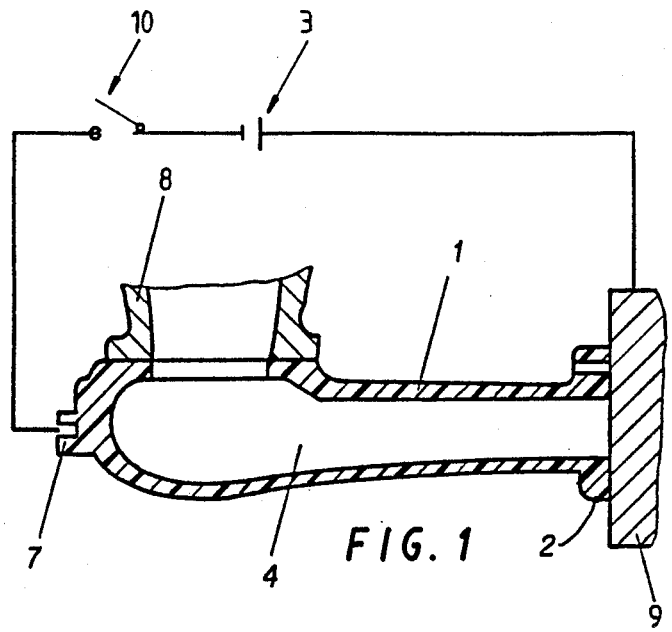
FIG. 1 is a sectional view of an intake manifold, which consists completely of an electrically conductive and electrically heatable polymeric material.

The functional principle of the intake manifold, when used as indicated, is shown in FIG. 1. With the wall 1, which consists completely of electrically conductive, polymeric material, the intake manifold encloses the flow channel 4 and is disposed between the carburetor 8 and the cylinder head 9 of the associated internal combustion engine. Flanges are provided for the mutual connection. The flange on the cylinder head at the same time has the function of an electrical connector, over which the wall 1 is in constant, electrically conducting connection with the negative pole of the associated voltage source 3, for example, the negative pole of the battery of the motor vehicle.

Connector 7 is provided at the greatest distance possible from connector 2. It has a connecting terminal for a cable, which is connected over a switching relay 10 with the positive pole of the associated voltage source 3. The switching relay 10, which in the final analysis constitutes a switch, is closed only under special circumstances, especially during the cold-running phase of an internal combustion engine. Closing the relay results in the immediate heating of the whole wall 1 of the intake manifold, as a result of which fuel is no longer able to condense on the internal surface. A problem-free cold-starting behavior of the engine is thereby ensured. At the same time, the opportunity is given by the enormous large extent of the internal surface of the wall 1 to heat the fuel/air mixture passing through the flow channel to any extent desirable. For this purpose, however, it is necessary to mount a temperature sensor in the flow channel, which can be done without difficulty during the manufacturing process for the intake manifold, and to replace the switching relay 10 by a control device. Such a measure can be recommended in relation to achieving a particularly low fuel consumption and particularly advantageous emission values.

Figure 2:
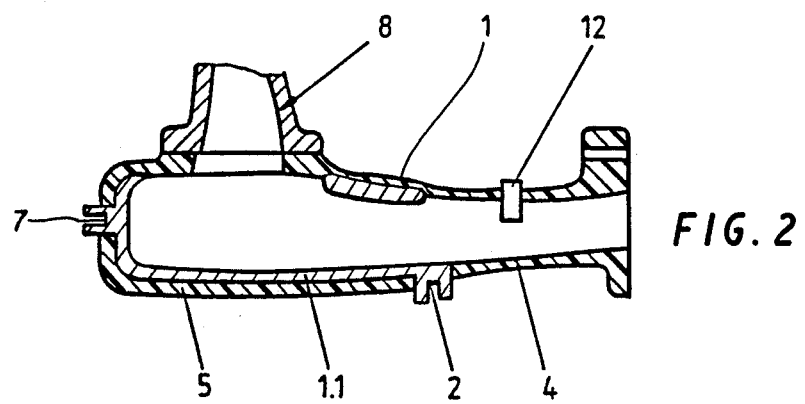
FIG. 2 is a sectional view of a version, in which only a part of the wall consists of an electrically conductive and electrically heatable polymeric material.

In the construction of FIG. 2, the wall 1, which consists completely of a polymeric material, is electrically conductive only in the region 1.1 and can be connected with a source of voltage and heated by this by means of connectors 2 and 7, which are at a distance from one another. The rest of the wall 1 consists of a polymeric material, which is not electrically conductive. This facilitates the molding of the sensor 12 directly into the intake manifold while the latter is being produced. At the same time, it also makes it possible to coat the region 1.1 of the wall, which consists of electrically conductive polymeric material, on the outside, that is, on the side averted from the flow channel 4, with an electrically insulating coating 5. Aside from decreasing the risk of an electrical short circuit, such a coating reduces the specific consumption of electric energy. Especially the last-mentioned advantage is of decisive importance for the economic operation of the inventive intake manifold.

Figure 3:
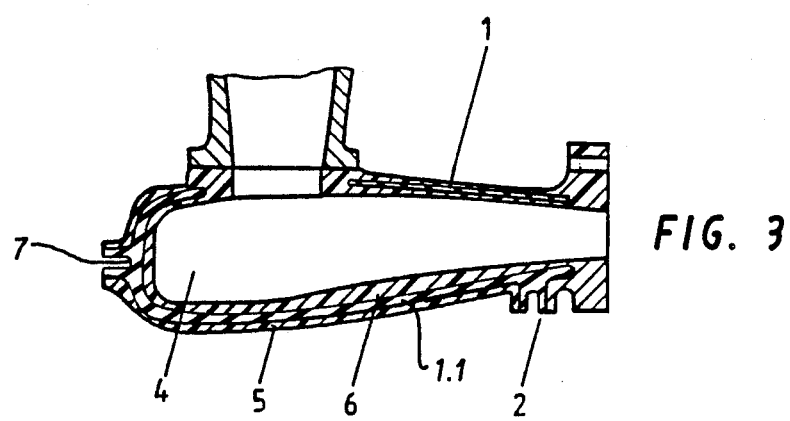
FIG. 3 is a sectional view of a version, similar to FIG. 2, in which the electrically conductive part of the wall is provided on the inside and on the outside with a coating of an electrically insulating, polymeric material.

The construction shown in FIG. 3 is similar to the previously described constructions with respect to its external shape. The wall, which consists completely of polymeric material, is, however, designed so that the electrically conductive region 1.1, which can be heated by means of a connection with a source of voltage, is covered on the inside as well as on the outside with a coating of nonconducting, polymeric material. Both coatings merge into one another at the ends without a gap, as a result of which the electrically conductive and heatable region is encapsulated completely. The mechanical and chemical resistance accordingly is particularly high. This endows such a construction of the inventive intake manifold with a long service life, over the whole course of which the electrical properties remain the same.

The thickness of the outer coating 5, which is averted from the flow channel 4, is greater than that of the inner coating 6, which faces the flow channel 4. In the first-mentioned case, it is about 1.5 mm, in the last-mentioned case about 3.4 mm.

The inventive intake manifold differs from the previously known construction by having a distinctly lower weight. It can be produced cost efficiently. The internal combustion engine equipped with it can achieve advantageous emission values and a good fuel efficiency. Moreover, it permits the use of a mixture-preparation aggregate of particularly simple construction. The previous problems with respect to cold starting and hot starting are eliminated completely. The installation is simple and problem-free and makes the previous use of cooling water connecting hoses and the like superfluous.

I claim:

1. In an intake manifold for an internal combustion engine, consisting of a flow channel, which is enclosed by an electrically conductive wall and which can be heated in at least a part of its region by the wall, the improvement which comprises that the wall (1) consists at least in the aforementioned part of an electrically conductive, polymeric material and can be connected by connectors (2, 7), which are at a distance from one another, with a source of voltage (3) and heated by this source.

2. An intake manifold as claimed in claim 1, wherein the wall (1) is provided with an electrically nonconducting polymeric coating (5) on the side averted from the flow channel (4).

3. An intake manifold as claimed in claim 2, wherein the wall is provided with an electrically nonconducting polymeric coating (6) on the side facing the flow channel (4).

4. An intake manifold as claimed in claim 1, in which the portion of the wall of electrically conductive material is provided on the inside and on the outside with coatings of electrically nonconductive material, wherein the thickness of the outer coating (5), which is averted from the flow channel (4), is greater than that of the inner coating (6), which faces the flow channel (4).

5. An intake manifold for an internal combustion engine comprising
   a wall defining a flow channel, said wall comprising a part of electrically conductive polymeric material, said part having an inside facing said channel and an outside opposed from said channel,
   a pair of electrical connectors connected to said part, one of said connectors being remote from said engine, the other connector being proximate said engine, whereby,
   upon connecting a voltage source across said connectors, said part can be heated.

6. An intake manifold as in claim 5 wherein the wall further comprises an electrically non-conductive polymeric coating on the outside of said part.

7. An intake manifold as in claim 6 wherein the wall further comprises an electrically non-conductive polymeric coating on the inside of said part.

8. An intake manifold as in claim 7 wherein the coating on the outside is thicker than the coating on the inside.

* * * * *